(12) United States Patent
Wilkendorf et al.

(10) Patent No.: US 9,764,260 B2
(45) Date of Patent: Sep. 19, 2017

(54) FILTERING DEVICE, AND FILTERING ELEMENT FOR USE IN SUCH A FILTERING DEVICE

(75) Inventors: Werner Wilkendorf, Ottweiler (DE); Volker Backes, Marpingen (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 189 days.

(21) Appl. No.: 13/261,344

(22) PCT Filed: Oct. 14, 2010

(86) PCT No.: PCT/EP2010/006292
§ 371 (c)(1),
(2), (4) Date: Sep. 18, 2012

(87) PCT Pub. No.: WO2011/079884
PCT Pub. Date: Jul. 7, 2011

(65) Prior Publication Data
US 2013/0008839 A1    Jan. 10, 2013

(30) Foreign Application Priority Data
Jan. 2, 2010   (DE) .................. 10 2010 003 961

(51) Int. Cl.
*B01D 35/00* (2006.01)
*B01D 29/11* (2006.01)
*B01D 35/06* (2006.01)

(52) U.S. Cl.
CPC ............ *B01D 29/114* (2013.01); *B01D 35/06* (2013.01); *B01D 2201/293* (2013.01);
(Continued)

(58) Field of Classification Search
USPC ......... 200/82.2, 276, 239; 210/90, 634, 637, 210/741, 767, 85, 100, 109, 130, 167.02,
(Continued)

(56) References Cited

U.S. PATENT DOCUMENTS 3,990,853 A * 11/1976 Godin ........................ 422/501
4,477,352 A * 10/1984 Pappas ....................... 210/448
(Continued)

FOREIGN PATENT DOCUMENTS

DE          92 15 351 U1     11/1993
DE     20 2007 008483 U1     1/2008
(Continued)

*Primary Examiner* — Richard Gurtowski
(74) *Attorney, Agent, or Firm* — Wenderoth, Lind & Ponack, L.L.P.

(57) ABSTRACT

A filtering device for fluids includes a filter housing (1) and a filter element (9) received in the filter housing. The filter element has an end cap (17) on at least one end. The end cap forms an enclosure for the corresponding end edge of the filtering material (23, 35) and is fixed on an element receiver (13) interacting with the bottom part (5) of the filter housing (1) to fix the position of the filter element (9) in its functional position. The element receiver forms a fluid path for the cleaned fluid exiting the hollow chamber (19) of the filter element (9). The element receiver (13) contains a valve arrangement (55) blocking the fluid path (35). A control device (79, 83) releasing the valve arrangement (55) in the functional position is on the end cap (17) of the filtering element (9). The end cap is fixed on the element receiver (13).

14 Claims, 8 Drawing Sheets

(52) U.S. Cl.
CPC .. *B01D 2201/298* (2013.01); *B01D 2201/313* (2013.01); *B01D 2201/4046* (2013.01); *B01D 2201/4084* (2013.01)

(58) Field of Classification Search
USPC .... 210/171, 350, 352, 351, 407, 409, 416.1, 210/418
See application file for complete search history.

(56) References Cited

U.S. PATENT DOCUMENTS

| | | | |
|---|---|---|---|
| 4,692,245 | A | 9/1987 | Church |
| 4,948,503 | A * | 8/1990 | Baumann et al. ............ 210/232 |
| 5,176,826 | A * | 1/1993 | Rosaen .......................... 210/232 |
| 5,666,915 | A * | 9/1997 | Kawashima et al. ..... 123/196 R |
| 5,783,078 | A | 7/1998 | Roll |
| 2008/0047891 | A1* | 2/2008 | Roesgen ...................... 210/236 |
| 2008/0053886 | A1 | 3/2008 | Marshall |

FOREIGN PATENT DOCUMENTS

| | | |
|---|---|---|
| DE | 10 2006/039826 A1 | 2/2008 |
| EP | 1 731 210 A1 | 12/2006 |
| WO | WO-02/062447 A1 | 8/2002 |
| WO | WO-2008/022813 A1 | 2/2008 |

* cited by examiner

Fig.1
State of the Art

FILTERING DEVICE, AND FILTERING ELEMENT FOR USE IN SUCH A FILTERING DEVICE

FIELD OF THE INVENTION

The invention relates to a filtering device for fluids, comprising a filter housing in which at least one filtering element, which defines a longitudinal axis, can be accommodated in the form of a filter cartridge. At least one filter cartridge end has an end cap forming an enclosure for the pertinent end edge of the filter material. The filter cartridge can be fixed on an element receiver which interacts with the bottom part of the filter housing in order to fix the position of the filtering element in its functional position forming a fluid path for the cleaned fluid which emerges from the filter cavity of the filtering element. Furthermore, the invention relates to a filtering element for such a filtering device.

BACKGROUND OF THE INVENTION

Filter devices of this type are readily available on the market in various versions. To a large extent, such filter devices are used for filtration of working fluids such as hydraulic fluids, fuels, lubricants, and the like. In fluid systems, specifically hydraulic systems, in which filter devices are used, the operational reliability of the system depends largely on the reliable operation of the filter devices located in the system. In other words, a failure or malfunction of the filter device can lead to failure or serious damage of the pertinent system and thus can cause significant economic loss.

A filter device and its parts as well as a method for operating the filter device are known from DE 10 2006 039 826 A1. The filter device has a filter housing part which encloses the filter element and which can be detachably connected to another filter housing part. A valve apparatus in the interconnected state of the housing parts clears a fluid path and, in the separated state of the housing parts from one another, at least partially blocks it. The valve apparatus preferably has a valve element which can be actuated via an actuating part of at least one of the two filter housing parts and/or of the filter element. Especially in the connected state of the housing parts, it opens the valve element and, in its state separated from one another, at least partially closes it. In this case, the first filter housing part forms a filter bowl for receiving the filter element. The second filter housing part forms the filter bowl with the fluid connections, especially in the form of a supply and drain. When the filter element is missing and the valve apparatus is closed, a control unit of the hydraulic circuit delivers a fault message and/or shuts off the hydraulic circuit.

DE 92 15 351 U discloses a filter device for filtering of fluids with a filter element and with a back pressure and an overload valve located in the bypass to the filter element and the back pressure valve. The filter device has a first connection site for supply of the unfiltered fluid from a load site which is supplied as part of a fluid circuit by a fluid pump and a second connection site between the filter element and the back pressure valve for discharging the filter fluid by a differential pressure-controlled valve located in the bypass to the filter element. Depending on the differential pressure on the filter element, a connection between the second connection site and a third connection site can be established which can be connected to the fluid circuit between the fluid pump and the load site. In this case, a switching valve can be provided which, in the absence of the filter element, establishes this connection between the second connection site and the third connection site. Furthermore, a movable element receiver for the filter element can be provided which, at a definable threshold value of the differential pressure on the filter element that is smaller than the threshold value necessary to open the differential pressure-controlled valve, travels against a stop against the force of the energy storage mechanism of the valve piston.

SUMMARY OF THE INVENTION

An object of the invention is to provide an improved filter device which is characterized by a high degree of operational reliability.

This object is basically achieved according to the invention by a filter device where the element receiver contains a valve arrangement which normally blocks the fluid path for the cleaned fluid, but which can be unblocked by a control device located on the end cap of the filter element, which end cap is to be fixed on the element receiver. This arrangement results in an increase of the operational reliability of the device in two respects. On the one hand, the risk is avoided that the pertinent system is inadvertently started in the event that the insertion of a filter element in the valve housing has been forgotten. In this case, due to the absence of the control device necessary for unblocking the valve arrangement on the end cap of the filter element to be used, the valve arrangement remains in the blocked state. Another especially important safety aspect is that the operation of the device is possible only when a filter element is used that has the control device which is suitable for unblocking the valve on the end cap which is to be fixed on the element receiver.

Thus, it is not only precluded that a filter element will be used which is unsuitable for the respective specific use and which does not satisfy the pertinent applicable specifications that ensure operational reliability, because it is, for example, not assigned to a corresponding pressure stage or has an unsuitable filter fineness, but the risk is also avoided that possibly a "discount element" available on the market will be used which does not meet the applicable safety standards.

In especially preferred exemplary embodiments, the element receiver for forming the fluid path for the cleaned fluid has a seating connection which projects from the housing bottom part axially in the direction of the filter element which is located in the operating position, and which connection contains the valve arrangement. Since the component which forms the fluid connection to the filter element is used at the same time as a valve housing for the valve arrangement, an especially simple and compact construction can be implemented.

In advantageous exemplary embodiments, the end cap of the filter element has a threaded connection which in the filtration process forms the fluid outlet from the filter cavity of the filter element which forms the clean side and can be screwed to the seating connection. The control device for the valve arrangement on the threaded connection is a control body which, in the course of being screwed to the seating connection, acts on the valve arrangement to unblock it. Because the end cap of the filter element is fixed by screwing it to the element receiver, for the control body, as a result of the axial force generated during the screw coupling process, a high actuating force for unblocking of the valve arrangement is available so that reliable actuation of the valve arrangement is possible even if it is preloaded in the blocking position with a comparatively high closing force.

With respect to the configuration of the valve arrangement, the arrangement can be designed such that the valve arrangement has a ring body which projects on the inside wall on the seating connection and which forms the valve seat for an axially movable valve body which is preloaded into the blocking position by a spring arrangement in the direction of the end cap.

In this type of configuration of the valve arrangement, the control body on the threaded connection forms an axial projection which acts on the valve body during the screw coupling process and moves it out of the blocking position against the force of the spring arrangement. Such a configuration is characterized by an especially simple, economical configuration both with respect to the threaded connection of the filter element and the element receiver.

In advantageous exemplary embodiments, the valve arrangement can have a ring body which projects on the inside wall of the seating connection and which forms the valve seat for the plate-shaped valve body. Such a valve arrangement in the form of a plate valve can be economically produced.

The seating connection of the element receiver is, however, also equally well suited as a valve housing for a spool valve with a valve spool having axial fluid passages. The seating connection has an end plate which closes the fluid passages of the spool in the blocking position.

In one configuration of the valve arrangement as a plate valve or as spool valve, a disk spring has fluid passages on the end region facing the housing bottom part in the seating connection for supporting the compression spring unit which is supported on the other hand on the valve body. The disk spring can have a central hollow pin which projects in the direction of the valve body and which forms the guide for a helical spring arrangement which surrounds it.

In order to easily make available the high closing force which is desirable for the valve arrangement, the helical spring arrangement can be formed by a spring assembly of two helical springs which are located coaxially to one another.

Filter devices of the type under consideration here can be equipped with a clogging indicator which, at a back pressure that exceeds a defined threshold value on the dirty side of the filter housing, generates an indicator signal. Due to the high actuating force that, in the course of screwing the threaded connection to the seating connection, is available to the control body for its actuation of the valve arrangement, it becomes advantageously possible to dimension the closing force of the spring arrangement of the valve arrangement to be sufficiently high such that the valve arrangement remains in the blocking position even at a fluid pressure that acts on the sealing body for purposes of opening and which is higher than the threshold value generating the indicator signal. This arrangement has the particular advantage of the clogging indicator having multiple functions. On the one hand, the indicator signal is delivered conventionally, which at the back pressure rising due to clogging of a contaminated filter element, delivers the signal for the required replacement process of the filter element. On the other hand, at the high closing force generated by the spring arrangement and provided according to the invention for the valve arrangement, an indicator signal is delivered even when an attempt is made to inadvertently operate the device without an inserted filter element or with an inserted, but unsuitable filter element. Due to the blocking characteristic of the valve arrangement provided according to the invention, before its opening, a back pressure builds up which triggers the signal of the clogging indicator.

The subject matter of the invention is also a filter element for use in a filter device with the filter element having these features.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
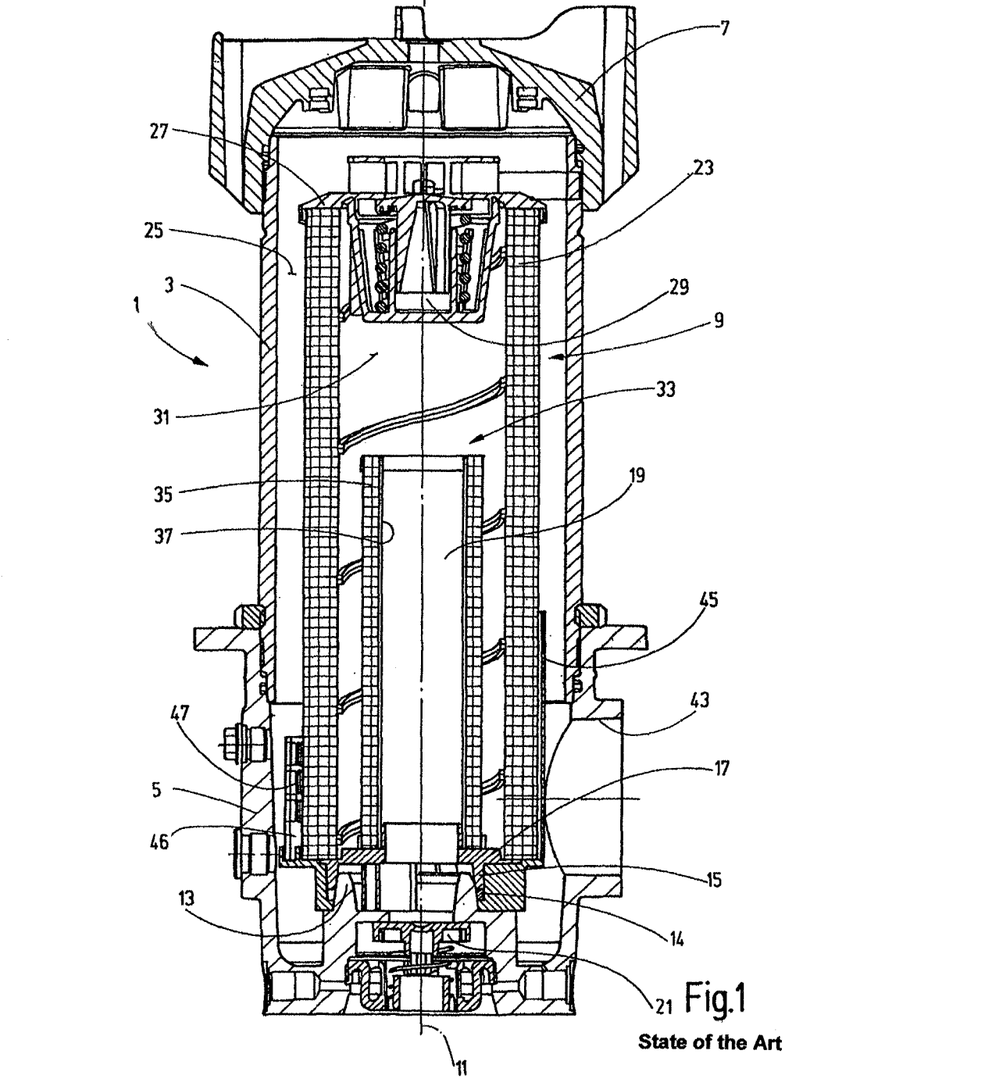
FIG. 1 is a side elevational view in section of a filter device corresponding to the prior art.

A filter device of conventional type that is shown in FIG. 1, comprises a hollow cylindrical filter housing 1 having a main part 3 and a bottom part 5 screwed together. The upper end of the main part 3, which is opposite the bottom part 5, can be closed by a screw-on housing cover 7. The housing 1 can accommodate a filter element 9 coaxially to the longitudinal axis 11 of the housing 1. For positioning and fixing in position, on the bottom part 5, there is an element receiver 13 in the form of a hollow body whose upper peripheral edge facing the filter element 9 for positioning of the filter element 9 with formation of a seal 14 interacts with a connection unit 15 located on the end cap 17 of the filter element 9 facing the bottom part 5. The connection unit 15 forms a fluid connection to the inner filter cavity 19 within the filter element 9, forming the clean side in the filtration process. The cleaned fluid, which emerges from the clean side via the connection unit 15, flows through the element receiver 13 and can emerge from the bottom part 5 via a bottom valve 21 which protects the housing outlet in the conventional manner.

In FIG. 1, the filter element 9 is designed as a two-stage element. Filter material 23 of coarser filter fineness is located on the outside of the filter element 9, with its outside bordering the outer housing space 25 which forms the dirty side in the filtration process and forming a prefilter. The lower edge of the filter material 23 on the bottom side is enclosed by the end cap 17. The top end of the filter material 23 is enclosed by an upper cover cap 27 on which there is a bypass valve arrangement 29 which, at a specified dirt-side pressure level, enables throughflow from the space 25 to the prefiltration space 31 on the inside of the filter material 23. In the two-stage version of the filter element 9, the prefiltration space 31 is not directly connected to the connection unit 15 of the end cap 17. Located upstream of the connection unit 15, a fine filter unit 33 with a filter material 35 of greater filter fineness surrounds a fluid-permeable support pipe 37, which is open to the connection unit 15 of the end cap 17, and together with the lower edge of the filter material 35 on the outside of the connection unit 15 is attached to the end cap 17. Thus, the space 19 forming the clean side in the filtration process is connected via the connection unit 15 to the fluid passage of the element receiver 13.

In FIG. 1, the fluid inlet 43 to the dirt-side space 25 on the housing bottom part 5 is in the vicinity of the end cap 17 of the filter element 9, which is in the operating position. As impact protection, on the outside of the end cap 17 in the peripheral area of the filter element 9 facing the inlet 43, a shielding plate 45 is attached which in the pertinent peripheral region extends arched along the outside of the outer filter material 23. In the lee region, which is opposite the fluid inlet 43, which faces away from the incident flow region and in which a flow-stabilized dirt trap basket 46 is formed, there is a trap magnet apparatus 47.

Figure 2:
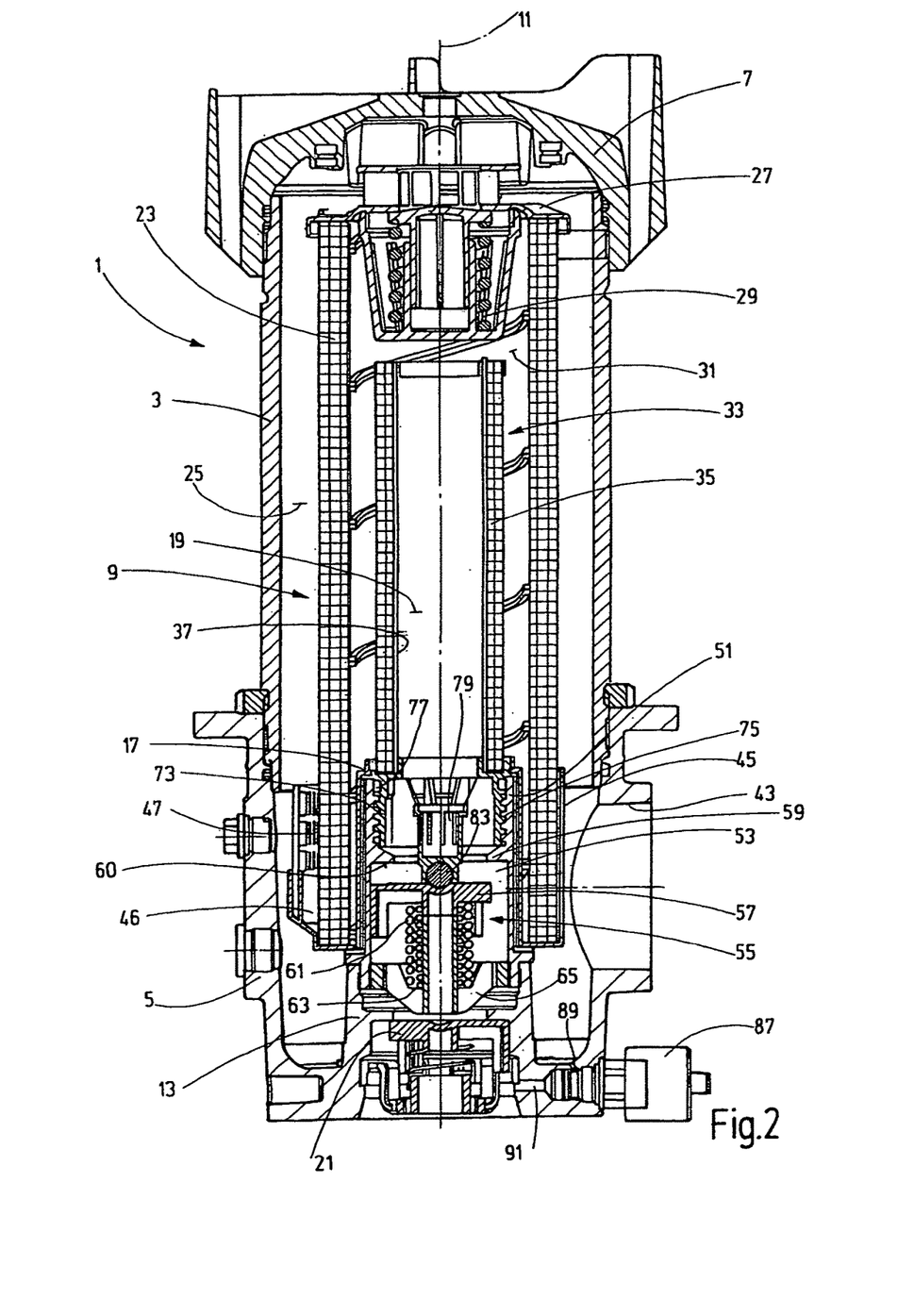
FIG. 2 is a side elevational view in section of a filter device according to a first exemplary embodiment of the invention, the state being shown in which a filter element suitable for use in the filter housing is in the operating position.
Figure 4:
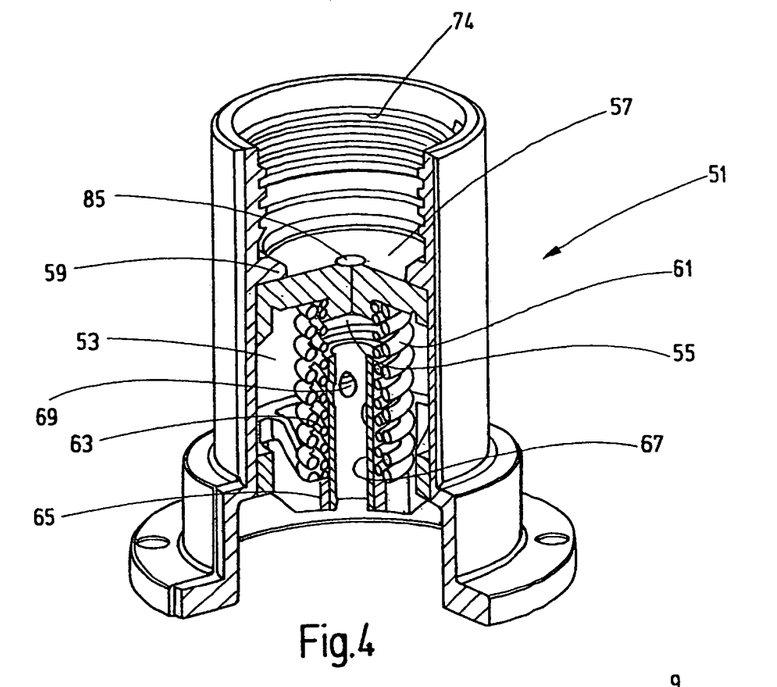
FIG. 4 is a perspective view in section of only the seating connection of the filter device of FIG. 2, approximately on the scale of FIG. 3.

The differences between the construction according to the invention and the construction from FIG. 1 corresponding to the prior art, are explained below. In this instance as well, the filter element 9 is designed as a two-stage element so that the interior of the filter housing 1, as shown above, is divided into a space 25 which forms the dirty side and which adjoins the fluid inlet 43, a prefiltration space 31 and an inner filter cavity 19 which forms the clean side. The major differences vis-á-vis the prior art, however, lie in the construction of the element receiver 13 and the construction of the end cap 17 of the filter element 9. The cap is to be affixed to the element receiver in the operating position. With respect to the configuration of the element receiver 13, there is the important particularity that it has a seating connection 51 projecting from the housing bottom part axially in the direction of the filter element 9, shown separately in FIG. 4. In this first exemplary embodiment, seating connection 51 forms an additional component of the element receiver 13, which, in the illustrated exemplary embodiment, is screwed to the remaining portion of the element receiver 13 and forms an axial extension of the element receiver 13. The interior of the seating connection 51 forms not only the fluid path 53 for fluid emerging from the clean side 19 of the filter element 9, but also forms the valve housing of a valve arrangement 55 which normally blocks the fluid path 53. The valve arrangement has a disk-shaped sealing body 57 which is preloaded by a spring force in the axial direction of movement against a ring body 59 projecting on the inside wall of the seating connection 51 and which forms an annular valve seat 60 for the sealing body 57. To generate the spring force which preloads the sealing body 57, there is a spring arrangement formed of two helical springs 61 and 63 which form a spring assembly. Spring 61, 63 are arranged coaxially to one another and, on the one hand, are supported on a spring cup 65 and, on the other hand, are supported on the bottom of the sealing body 57. The spring cup 65, which is fixed in the seating connection, has a central hollow pin 57 projecting in the direction of the sealing body 57 as a guide for the helical springs 61 and 63 which surround it and has a fluid passage 69 which forms the continuation of the fluid path 53 in the open state of the valve arrangement 55.

Figure 3:
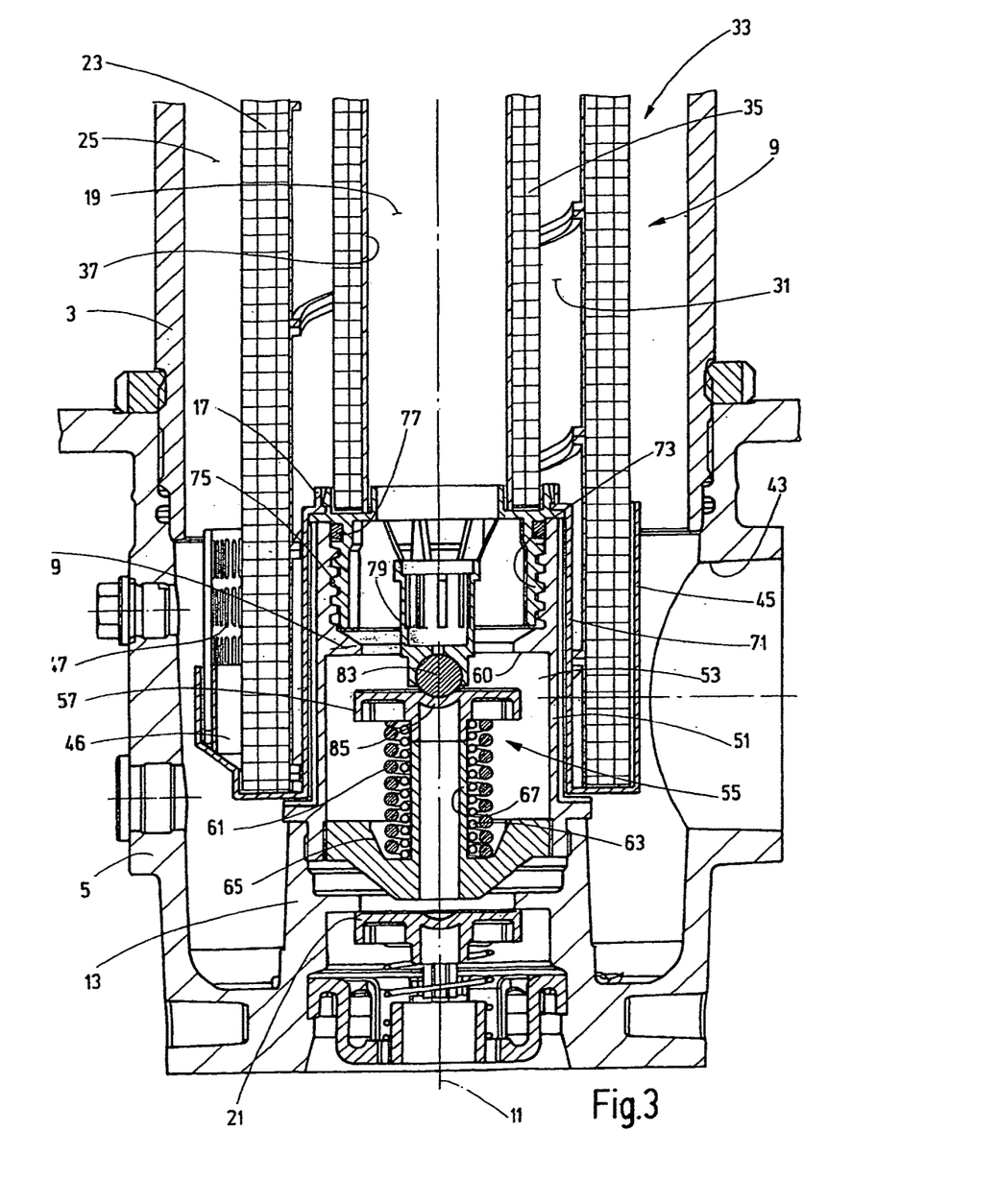
FIG. 3 is a partial side elevational view in section of the bottom-side region of the filter device of FIG. 2, exploded and enlarged compared to FIG. 2.
Figure 5:
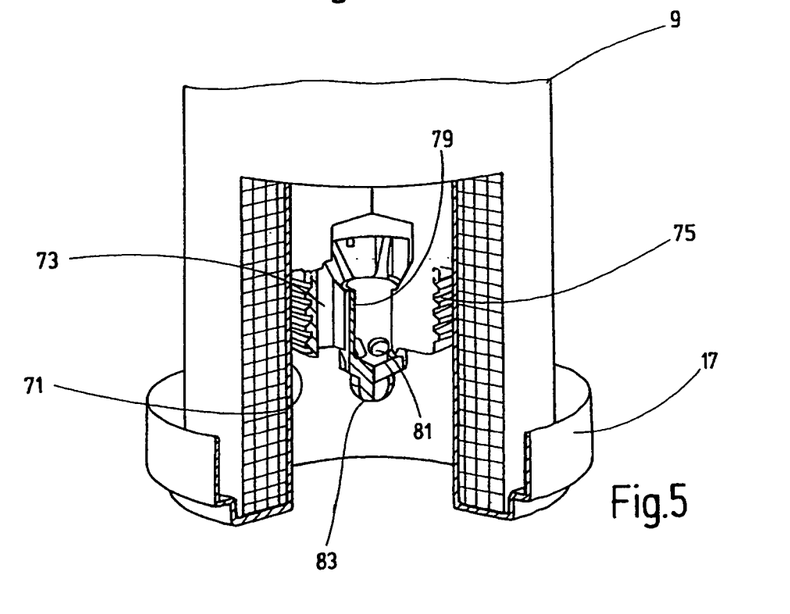
FIG. 5 is a schematically simplified, and partially cutaway perspective view in section of one end section of a filter element intended for use in the filter device according to the invention.
Figure 6:
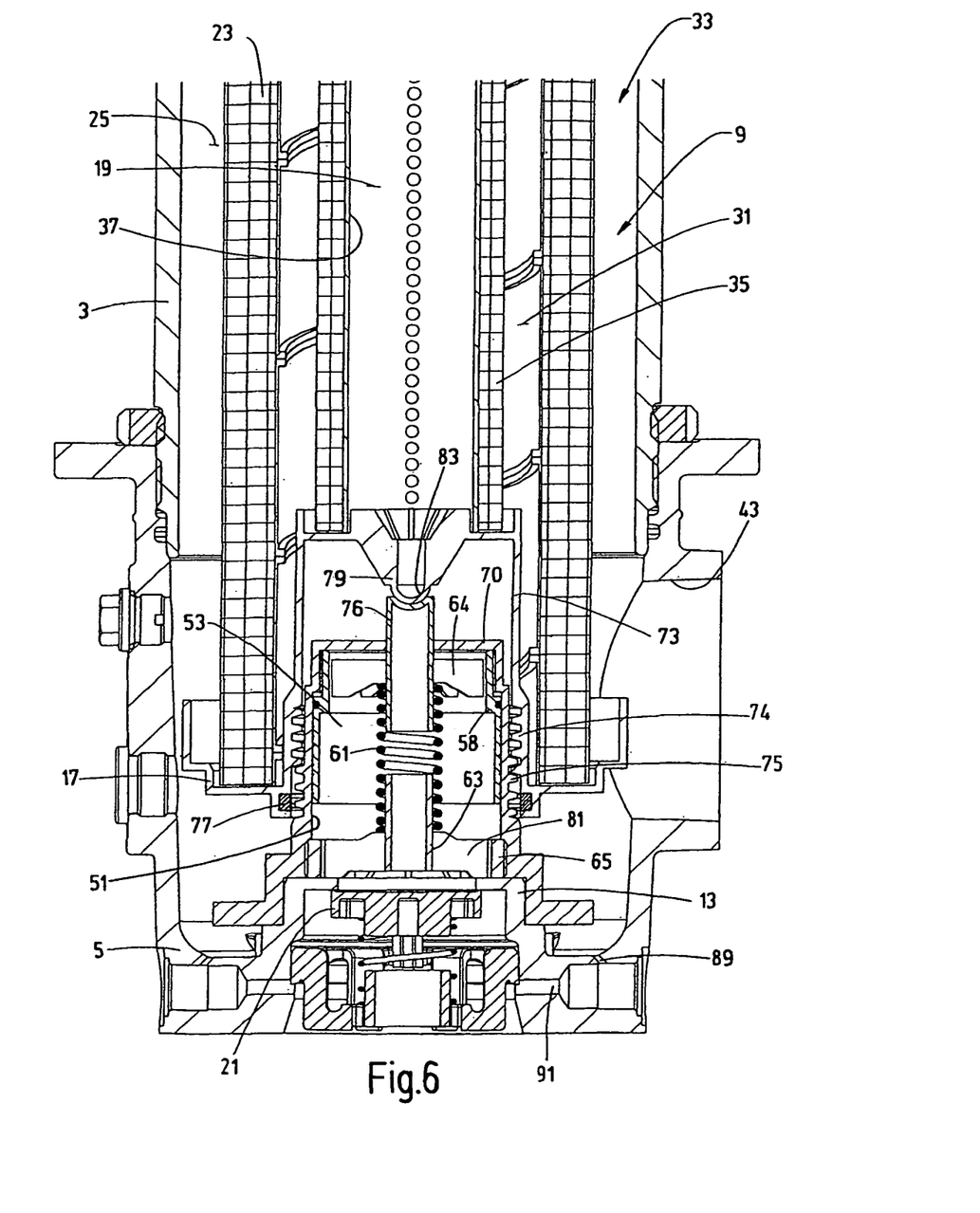
FIG. 6 is a partial side elevational view in section of the bottom side region of a filter device according to a second exemplary embodiment of the invention being shown in the state in which a filter element suitable for use has not yet been completely inserted into the operating position.

For the interaction with the seating connection 51, the end cap 17 of the assigned filter element 9, as already indicated, has a special configuration which is shown in FIGS. 2, 3, and 5. As is apparent, the end cap 17, within a connecting part 71 (FIG. 5) that extends over the outside of the seating connection 51, has a coaxially projecting threaded connection 73 provided with an external thread 75 by which it can be screwed to an internal thread 74 on the top end region of the seating connection 51. A seal arrangement 77 is located at the start of the external thread 75 forming a seal. Within the threaded connection 73, there is a control device which controls the valve arrangement 55 out of the normal blocking position into the open position when a filter element 9 intended for use is moved into the operating position by screwing the threaded connection 73 to the seating connection 51, as is shown in FIGS. 2 and 3. The control device has a control body in the form of a coaxial projection 79 within the threaded connection 73. The projection 79 forms a hollow body with fluid passages 81 (FIG. 5). The end of projection 79 facing the sealing body 57 has a ball 83. When the threaded connection 73 is screwed to the seating connection 51, ball 83 transfers the screw force as an actuating force to a recessed ball seat 85 of the sealing body 57 in order to raise it against the force of the helical springs 61, 63 off the valve seat 60 on the ring body 59 so that the operating state shown in FIGS. 2 and 3 results in the fluid path 53 being cleared by the element receiver 13.

Because the connection between the filter element 9 and element receiver 13 takes place by screwing the threaded connection 73 of the end cap 17 of the filter element 9 to the seating connection 51 of the element receiver 13, for the control device for actuating the valve arrangement 55, when the threaded connection 73 is being screwed in, a high actuating force is available which moves the sealing body 57 against the closing force via the ball 83. This arrangement makes it possible to design the spring assembly of the helical springs 61 and 63 such that the sealing body 57 remains in the blocking position even at a high pressure difference within the seating connection 51 which seeks to open the valve arrangement 55. This structure not only ensures that the filter device cannot be operated in a case in which a filter element 9 has inadvertently not been inserted into the filter housing 1, because the operating system pressure is not sufficient to unblock the valve arrangement 55. It also advantageously enables the generation of an indicator signal in conjunction with a clogging indicator 87 which is typically provided in such filter devices. FIG. 2 shows on the bottom part 5 of the filter housing 1 such a clogging indicator 87, which as a result of a specified pressure difference between a channel 89 which leads to the dirty side 25, and a channel 91, which leads to the exterior, generates an electrical indicator signal. The specified signal-generating pressure difference is chosen such that an increase of the back pressure on the fluid inlet 43 is signaled which corresponds to a clogging state of the filter element 9 at which the filter element 9 should be replaced. Due to the aforementioned high actuating force that is available for the unblocking of the valve arrangement 55, the spring preload of the valve arrangement 55 can be chosen such that the valve arrangement 55 remains blocked, even if a pressure difference is active at which the clogging indicator 87 responds. Thus the valve arrangement 55 not only prevents operation of the device without an inserted filter element or with an inserted "incorrect" filter element which does not contain the control device which unblocks the valve arrangement 55, but also signaling of this unallowable operating state takes place via the clogging indicator 87 as an additional function thereof.

Figure 7:
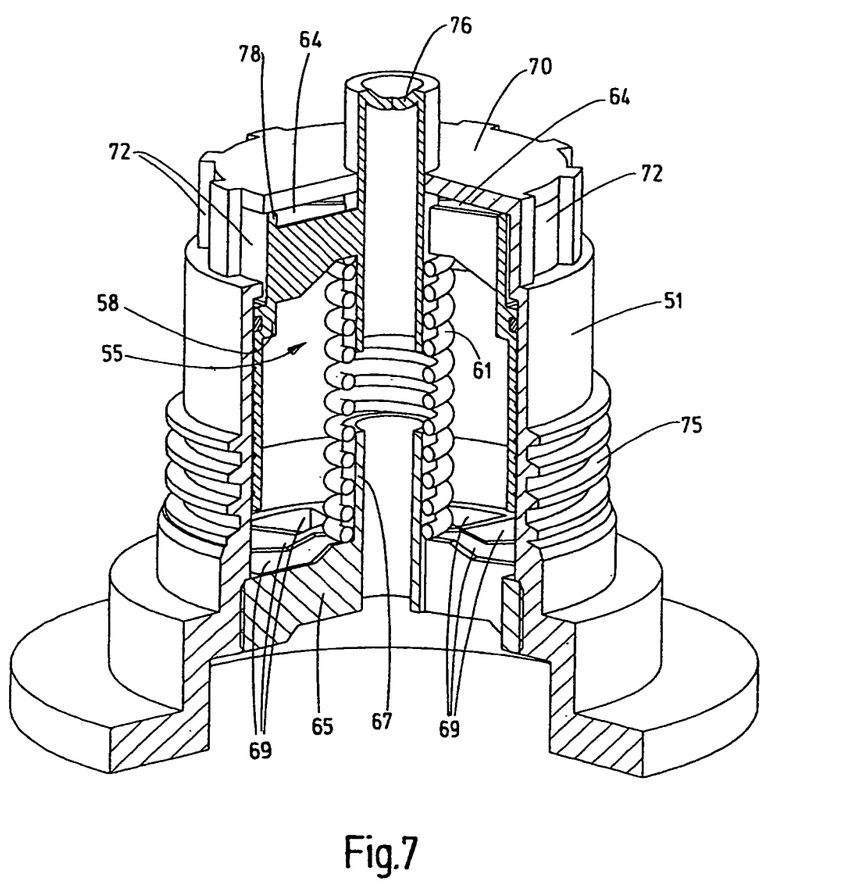
FIG. 7 is a perspective view in section of the seating connection of the filter device of FIG. 6.
Figure 8:
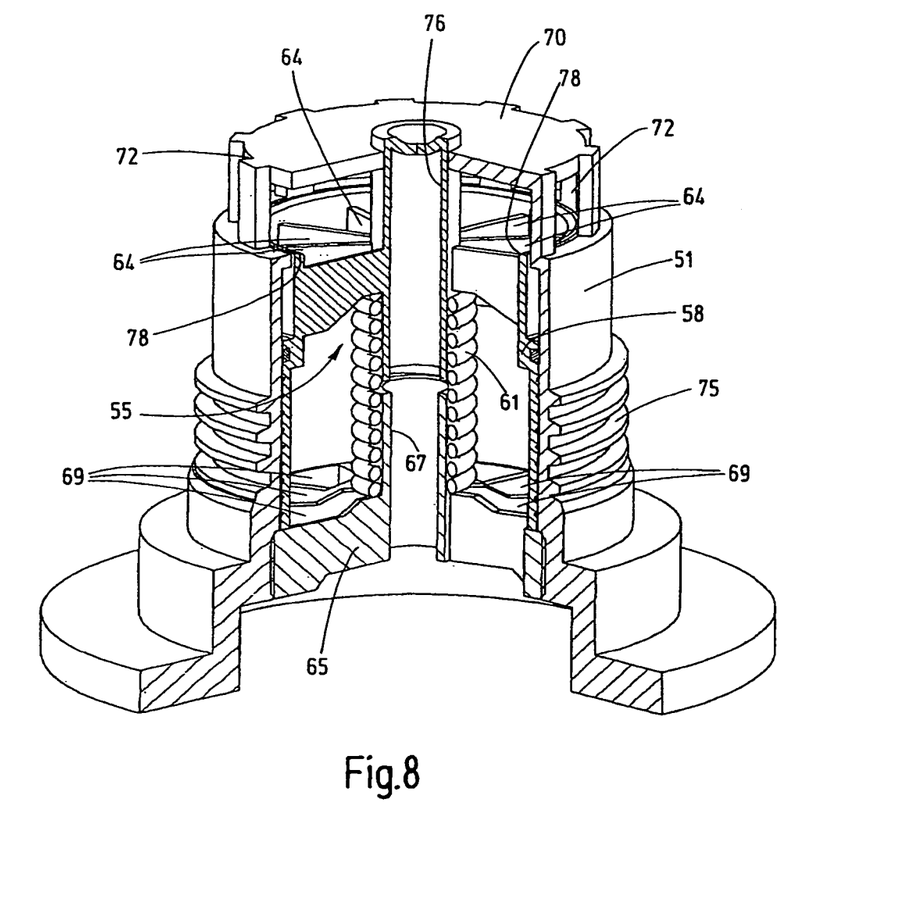
FIG. 8 is a perspective view in section of the filter device of FIG. 6 with the valve arrangement of the seating connection shown in the unblocked state.
Figure 9:
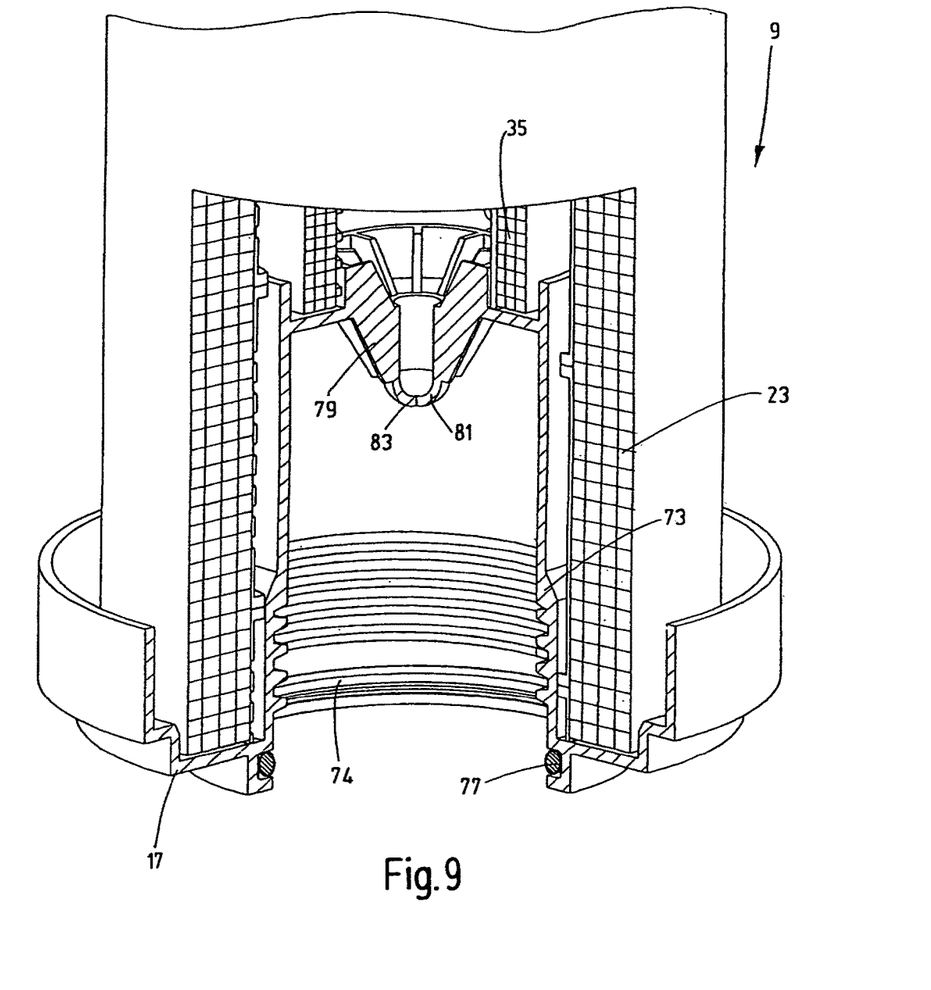
FIG. 9 is an enlarged perspective view in section of the end section of one filter element for use in the filter device of FIG. 6.

The second exemplary embodiment shown in FIGS. 6 to 9 differs from the first exemplary embodiment in that the valve arrangement 55 is not designed in the form of a plate valve, but in the form of a spool valve. As in the first exemplary embodiment, the seating connection 51 of the element receiver 13 forms the valve housing for the valve body located therein in the form of a valve spool 58. FIGS. 7 and 8 show the details of the spool valve. FIG. 9 shows the configuration of the threaded connection 73 which has been altered compared to FIG. 5 on the end cap 17 of the filter element 9. Unlike in the first exemplary embodiment, the threaded connection 73 has an internal thread 74, and the seating connection 51 on the element receiver 13 is provided with an external thread 75. As above, in the interior of the threaded connection 73, there is an axially projecting control body in the form of a projection 79 with an end ball 83 on which there is a fluid passage 81. Unlike in the example described first, the seating connection 51 on the end facing the filter element 9 is not open, but has an end plate 70 underneath which fluid inlets 72 enable fluid entry into the interior of the seating connection 51 when the valve arrangement is in the unblocked state, as is shown in FIG. 8, in which the valve spool 58 is pushed against the force of the spring 61. For this displacement motion in interaction with the projection 79 on the threaded connection 73, the valve spool 58 has a shaft 76 which extends through the end plate 70. FIG. 7 shows the blocking position of the spool valve in which closing edges 78 of the valve spool 58 adjoin the inside of the end plate 70 so that fluid cannot enter through the lateral inlets 72. When the valve spool 58 is moved away from the end plate 70 as a suitable filter element 9 is being screwed to the seating connection 51, which is shown in FIG. 8, fluid entering via the inlets 72 travels through fluid passages 64 of the valve spool 58 into the interior of the seating connection 51 so that the valve arrangement 55 is unblocked.

While various embodiments have been chosen to illustrate the invention, it will be understood by those skilled in the art that various changes and modifications can be made therein without departing from the scope of the invention as defined in the appended claims.

What is claimed is:

1. A filtering device for fluids; comprising:
   a filter housing defining a longitudinal axis and having a bottom part interacting with an element receiver;
   at least one filter element formed of a filter cartridge with filter material received in said filter housing and having an end cap on at least one end of said filter cartridge, said end cap forming an enclosure of an end edge of said filter material and fixable on said element receiver to fix said filter element in an operational position and to form a fluid path for cleaned fluid emerging from a filter cavity of said filter element, said filter cavity forming a clean side of said filter element, said element receiver including a seating connection projecting axially from said bottom part of said filter housing in a direction of said filter element in the operating position, forming said fluid path and having threads thereon, said end cap having a threaded connection with end cap threads on said end cap, said threaded connection forming a fluid outlet from said filter cavity of said filter element and being threadable with said threads of said seating connection;
   a valve arrangement contained in said seating connection blocking said fluid path; and
   a control body having a control device on said end cap acting on and unblocking said valve arrangement during movement of said end cap to an operating position of said end cap when said end cap is threaded on said seating connection.

2. A filtering device according to claim 1 wherein said valve arrangement comprises a valve body axially movable on an inside wall of said seating connection and biased by a spring arrangement in a direction of said end cap into a blocking position.

3. A filtering device according to claim 2 wherein said control body forms an axial projection acting on said valve body when said threaded connection is threaded in said seating connection and moves said valve body out of a blocking position thereof against a biasing force of said spring arrangement.

4. A filtering device according to claim 3 wherein said valve body has a ring body projecting on said inside wall of said seating connection and forming a valve seat for said valve body, said valve body being plate-shaped.

5. A filtering device according to claim 4 wherein said threaded connection comprises an external thread and threaded to an internal thread located in said seating connection.

6. A filtering device according to claim 3 wherein said valve body comprises a valve spool with axial fluid passages; and
   said seating connection comprises an end plate closing said axial fluid passages in the blocking position.

7. A filtering device according to claim 6 wherein said threaded connection of said end cap comprises an internal thread threadable to an external thread located on said seating connection.

8. A filtering device according to claim 2 wherein said valve arrangement comprises a spring cup having fluid passages, being attached to an end region facing said bottom part of said filter housing in said seating connection and supporting said spring arrangement supported on said valve body, said spring arrangement being a compression spring unit.

9. A filtering device according to claim 8 wherein said spring cup comprises a central hollow pin projecting on a direction of a sealing body of said valve body and forming a guide for said compressing spring unit, said compression spring unit being a helical spring arrangement.

10. A filtering device according to claim 9 wherein said helical spring unit comprises a spring assembly of two helical springs arranged coaxially.

11. A filtering device according to claim 2 wherein a clogging indicator is coupled to said filter housing and generates an indicator signal when back pressure on a dirty side of said filter housing exceeds a defined threshold valve; and
   a closing force of said spring arrangement is dimensioned such that said valve arrangement remains in the blocking position at a fluid pressure acting on a sealing body of said valve body for opening and being higher than the threshold valve generating the indicator signal.

12. A filter element for a filter device, comprising:
a filter material with an end edge, and a filter cavity forming a clean side of said filter material during filtration; and
an end cap on said end edge and forming an enclosure for said end edge, said end cap being fixable on an element receiver interacting with a bottom part of a filter housing for fixing said end cap and said filter material in a functional position, said end cap having an axially projecting threaded connection with threads on said end cap forming a fluid outlet from said filter cavity, said threaded connection being threadable to the element receiver, said threaded connection having a control device acting on a valve arrangement to unblock the valve arrangement that normally blocks a fluid passage through the element receiver.

13. A filter element according to claim 12 wherein said control device is in said threaded connection.

14. A filtering device according to claim 1 wherein said control device is located in said threaded connection.

* * * * *